US008467725B2

(12) United States Patent
Alrabady et al.

(10) Patent No.: US 8,467,725 B2
(45) Date of Patent: Jun. 18, 2013

(54) INITIATING WIRELESS COMMUNICATION BETWEEN A VEHICLE AND AN ACCESS POINT

(75) Inventors: Ansaf I. Alrabady, Livonia, MI (US); Fred W. Huntzicker, Ann Arbor, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1193 days.

(21) Appl. No.: 12/353,066

(22) Filed: Jan. 13, 2009

(65) Prior Publication Data

US 2010/0178872 A1 Jul. 15, 2010

(51) Int. Cl.
*H04B 7/00* (2006.01)

(52) U.S. Cl.
USPC ......................................... 455/41.2; 370/328

(58) Field of Classification Search
USPC .............. 455/41.2, 441, 456.1, 436; 370/328, 370/331
See application file for complete search history.

(56) References Cited

U.S. PATENT DOCUMENTS

| 6,052,598 | A | * | 4/2000 | Rudrapatna et al. | ........ | 455/456.1 |
| 6,160,509 | A | * | 12/2000 | Graziani et al. | ......... | 342/357.57 |
| 6,266,612 | B1 | * | 7/2001 | Dussell et al. | ................ | 701/516 |
| 6,606,560 | B1 | * | 8/2003 | Clark | ........................... | 701/469 |
| 6,611,688 | B1 | * | 8/2003 | Raith | ......................... | 455/456.1 |
| 6,671,621 | B2 | * | 12/2003 | Chen et al. | .................... | 701/470 |
| 6,925,378 | B2 | * | 8/2005 | Tzamaloukas | ................ | 701/428 |
| 7,016,691 | B2 | * | 3/2006 | Yaguchi et al. | ............ | 455/456.1 |
| 7,054,646 | B2 | * | 5/2006 | Naghian | ..................... | 455/456.1 |
| 7,177,652 | B1 | * | 2/2007 | Hopper et al. | ............. | 455/456.1 |
| 7,525,425 | B2 | * | 4/2009 | Diem | ...................... | 340/539.13 |
| 7,680,625 | B2 | * | 3/2010 | Trowbridge et al. | .......... | 702/182 |
| 7,738,874 | B1 | * | 6/2010 | Sill et al. | ....................... | 455/441 |
| 7,830,842 | B2 | * | 11/2010 | Strutt et al. | .................... | 370/338 |
| 7,969,920 | B2 | * | 6/2011 | Wentink | ........................ | 370/278 |
| 7,983,690 | B2 | * | 7/2011 | Oesterling et al. | ......... | 455/456.1 |
| 7,991,362 | B2 | * | 8/2011 | Lane et al. | ..................... | 455/71 |
| 8,014,788 | B2 | * | 9/2011 | Alizadeh-Shabdiz et al. | .......................... | 455/456.1 |
| 8,099,110 | B2 | * | 1/2012 | Kodali et al. | .............. | 455/456.5 |
| 8,195,390 | B2 | * | 6/2012 | Schliermann | ................ | 701/409 |
| 2003/0037108 | A1 | * | 2/2003 | Peiffer et al. | ................ | 709/203 |
| 2004/0203918 | A1 | * | 10/2004 | Moriguchi et al. | ........ | 455/456.1 |
| 2004/0230370 | A1 | * | 11/2004 | Tzamaloukas | ................ | 701/200 |
| 2005/0018686 | A1 | * | 1/2005 | Igarashi et al. | ............ | 370/395.2 |
| 2005/0037756 | A1 | * | 2/2005 | Yaguchi et al. | .............. | 455/436 |
| 2006/0109144 | A1 | * | 5/2006 | Xu et al. | .................. | 340/995.15 |
| 2006/0224319 | A1 | * | 10/2006 | Rogers | .......................... | 701/213 |
| 2007/0270171 | A1 | * | 11/2007 | Wentink | ........................ | 455/515 |
| 2008/0137860 | A1 | * | 6/2008 | Silvernail | ...................... | 380/270 |
| 2008/0219192 | A1 | * | 9/2008 | Sim et al. | ...................... | 370/310 |
| 2009/0024315 | A1 | * | 1/2009 | Scheibe | ........................ | 701/208 |
| 2009/0063040 | A1 | * | 3/2009 | Schliermann | ................ | 701/209 |
| 2009/0111466 | A1 | * | 4/2009 | Montemurro et al. | ........ | 455/434 |
| 2010/0091657 | A1 | * | 4/2010 | Tsfaty et al. | ................. | 370/241 |
| 2010/0267380 | A2 | * | 10/2010 | Montemurro et al. | ........ | 455/434 |
| 2011/0202202 | A1 | * | 8/2011 | Hori et al. | ........................ | 701/2 |

* cited by examiner

*Primary Examiner* — Lewis West

(74) *Attorney, Agent, or Firm* — Ingrassia Fisher & Lorenz, P.C.

(57) ABSTRACT

Methods and a vehicle are provided for initiating a short range radio frequency (RF) connection between the vehicle and an access point. The vehicle includes transceiver circuitry comprising receiver circuitry and transmitter circuitry, a Global Positioning System (GPS) receiver for receiving GPS coordinates, and a controller. The controller is coupled to the GPS receiver for determining a location of the vehicle in response to the GPS coordinates. The controller is also coupled to the transmitter circuitry for providing a probe request thereto for transmission to the access point in order to initiate the short range RF connection in response to the location of the vehicle.

11 Claims, 4 Drawing Sheets

INITIATING WIRELESS COMMUNICATION BETWEEN A VEHICLE AND AN ACCESS POINT

TECHNICAL FIELD

The present invention generally relates to radio frequency (RF) communication, and more particularly relates to a method and apparatus for initiating RF communication between a vehicle and an access point.

BACKGROUND OF THE INVENTION

Automobile vehicles today are being equipped with flexible computing platforms which provide a number of new functions. For example, the vehicle is capable of wirelessly coupling to a computer via a short range radio frequency (RF) connection to an access point, such as a home access point, to allow a user to upload content, such as digital music or navigational information, to the flexible computing platform. One mode of communication between the vehicle and the access point is wireless communication in accordance with wireless local area network standard IEEE 802.11. In order for the vehicle to initiate the RF connection between the vehicle and the access point in compliance with the wireless local area network standard IEEE 802.11, either the access point needs to periodically transmit a beacon or the vehicle needs to continuously transmit a probe request. However, a transmitted beacon includes a service set identifier (SSID) and periodic transmission by an access point is problematic for users who configure the access point to hide the SSID in order to protect their privacy. Therefore, transmission of a probe request is a preferable method for initiating the RF connection. Yet, continuous transmission of a probe request from a vehicle fails to protect the privacy of the vehicle as the probe request reveals the vehicle's identity by revealing vehicle information such as the vehicle's SSID and the vehicle's Media Access Control (MAC) address.

Accordingly, it is desirable to provide a method and apparatus for initiating RF communication between a vehicle and an access point which preserves the privacy of both the home access point and the vehicle. Furthermore, other desirable features and characteristics of the present invention will become apparent from the subsequent detailed description and the appended claims, taken in conjunction with the accompanying drawings and the foregoing technical field and background.

SUMMARY OF THE INVENTION

A method is provided for initiation of a short range radio frequency (RF) connection between a vehicle and an access point. The method includes the step of transmitting a probe request from the vehicle to initiate the short range RF connection in response to a location of the vehicle.

Another method is provided for defining a predetermined location. The method includes the steps of determining Global Positioning System (GPS) coordinates for a vehicle in response to a received input and, thereafter, defining the predetermined location in accordance with the GPS coordinates.

A vehicle is also provided for initiating a short range RF connection between the vehicle and an access point. The vehicle includes transceiver circuitry comprising receiver circuitry and transmitter circuitry, a GPS receiver for receiving GPS coordinates, and a controller. The controller is coupled to the GPS receiver for determining a location of the vehicle in response to the GPS coordinates. The controller is also coupled to the transmitter circuitry for providing a probe request thereto for transmission to the access point in order to initiate a short range RF connection in response to the location of the vehicle.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
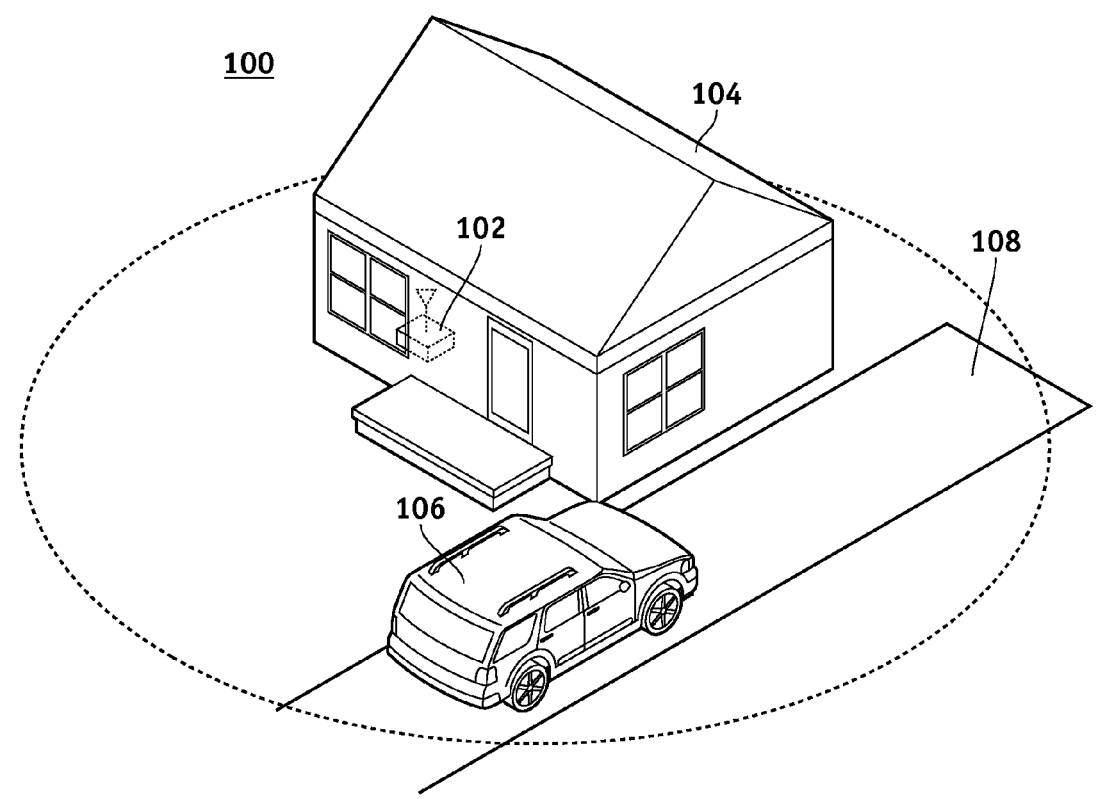
FIG. 1 illustrates a diagram of a system including a vehicle and a home access point in accordance with an embodiment of the present invention.

Referring to FIG. 1, a system 100 is depicted which allows for a home access point 102 in a residence 104 to connect to a flexible computing platform of a vehicle 106 via a short range radio frequency (RF) connection (e.g., a WiFi connection). While the home access point 102 is utilized for the description of the system 100, those skilled in the art will realize that an access point in accordance with the present invention is not limited to an access point in a home or residence. An access point in accordance with the present invention could also be an access point in a non-residential location, such as a work or commercial setting, including a vehicle dealer.

Once connection is established, the home access point 102 can wirelessly upload content, such as digital music or navigational information, to the flexible computing platform of the vehicle 106. Since sending a probe request from the vehicle 106 requires transmission of sensitive information such as a unique service set identifier (SSID) identifying the vehicle 106, in accordance with the present embodiment, the vehicle will not transmit a probe request until certain preconditions are met indicating that the vehicle 106 is in a driveway 108 or authorized home parking location for the vehicle 106 (e.g., assigned parking spot in a condominium or apartment, or designated parking spot on a road in front of the residence 104). These preconditions include location (such as within a certain distance, such as within radius 110, of the residence 104) and speed (such as parked or zero speed). While a circular boundary 110 is depicted in FIG. 1 based upon a radius from the predetermined location, the present invention is not limited a circular geoboundary as any geoboundary (e.g. a polygon) defined a by a distance from the predetermined location is an acceptable precondition in accordance with the present invention.

In accordance with the present embodiment, circuitry in the vehicle 106 transmits a probe request in compliance with wireless local area network standard IEEE 802.11 to initiate a short range RF connection with the home access point 102 when the speed is less than or equal to a predetermined speed and the location is within an acceptable distance of a predetermined location. The probe request begins an association phase and the home access point 102, once the probe request is detected, will respond with an association response. Thereafter, as discussed in more detail below, the vehicle 106 authenticates the home access point 102 and thereafter allows communication between a computer at the home access point 102 and the flexible computing platform of the vehicle 106.

While the present embodiment discussed herein describes an embodiment of an association phase for a wireless local area network standard IEEE 802.11 communication which utilizes vehicle specific information such as a service set identifier (SSID) and a Media Access Control (MAC) address and is initiated by a wireless enabled motor vehicle, those skilled in the art of RF communications will realize that the methodology of protecting device sensitive information in accordance with the present embodiment has application in other short- and long-range RF wireless link communication, such as Bluetooth, wherein vehicle specific information indicates a footprint about the vehicle's presence.

Figure 2:
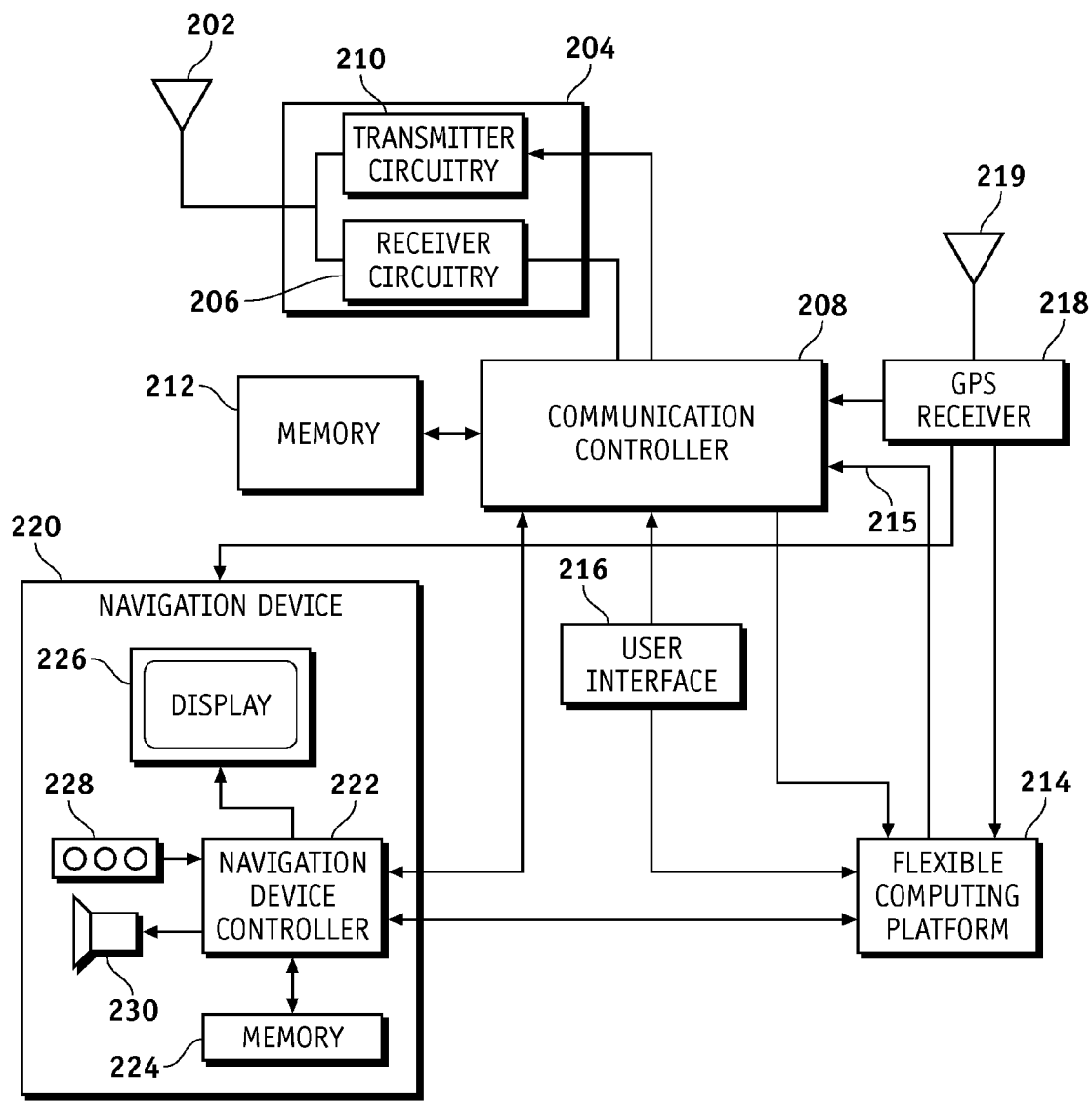
FIG. 2 illustrates a block diagram of an apparatus of the vehicle of the system of FIG. 1 in accordance with the embodiment of the present invention.

Referring to FIG. 2, a block diagram of circuitry in the vehicle 106 in accordance with the present embodiment includes an antenna 202 for receiving and transmitting RF signals on a short range RF channel such as a WiFi channel coupled to transceiver circuitry 204. The transceiver circuitry 204 includes receiver circuitry 206 for demodulating and decoding the RF signals to recover information therefrom and is coupled to a communication controller 208 for providing the information thereto. The transceiver circuitry 204 also includes transmitter circuitry 210 for receiving information from the communication controller 208 and generating RF signals in response thereto by encoding information and modulating the encoded information onto RF waves within the short range RF channel.

The vehicle 106 also includes a nonvolatile memory 212 coupled to the controller 208 and storing information for operation of the vehicle in accordance with the preferred embodiment, including predetermined home location information. The vehicle 106 also includes a flexible computing platform 214 for monitoring various vehicle parameters such as speed and handling a variety of functions for the vehicle 106 such as digital audio or visual entertainment information (e.g., digital music). In addition to other parameters, the flexible computing platform 214 provides a speed signal 215 to the communication controller 208 so that the communication controller 208 can monitor a speed of the vehicle 106 in accordance with the present embodiment. User interface devices 216 are coupled to the communication controller 208 and to the flexile computing platform for allowing user operation of various functions of the vehicle 106.

Global Positioning System (GPS) receiver circuitry 218 receives GPS signals via an antenna 219 tuned to a GPS signaling channel and generates a present location in response to the GPS signals received thereby, the GPS receiver circuitry being coupled to the communication controller 208 and the flexible computing platform 214 for providing information indicating the present location thereto.

In addition to the above elements, the vehicle 106 may include a navigation device 220 for providing navigational assistance to a user of the vehicle. The navigation device 220 includes a navigation controller 222 and a navigation memory 224. The navigation memory 224 stores navigation map data and other information for the operation of the navigation device 220. Also, the navigation device 220 may include several user interface devices coupled to the controller such as a display 226 for providing visual navigation information, a user input device 228 comprising one or more buttons for receiving user inputs, and an audio output device 230, such as a speaker, for providing audible navigation information. The navigation device 220 operates in a manner familiar to those skilled in the art.

In accordance with the present embodiment, the controller 208 determines in response to either or both of the speed of the vehicle 106 and a location of the vehicle 106 whether to initiate an association phase between the vehicle 106 and the home access point 102. Only if the controller 208 determines that the location and/or speed of the vehicle 106 falls within predetermined parameters does the controller 208 provide vehicle specific information within a probe request to the transmitter circuitry 210 for encoding and modulating to generate RF signals for transmission from the antenna 202 to the home access point 102.

Figure 3:
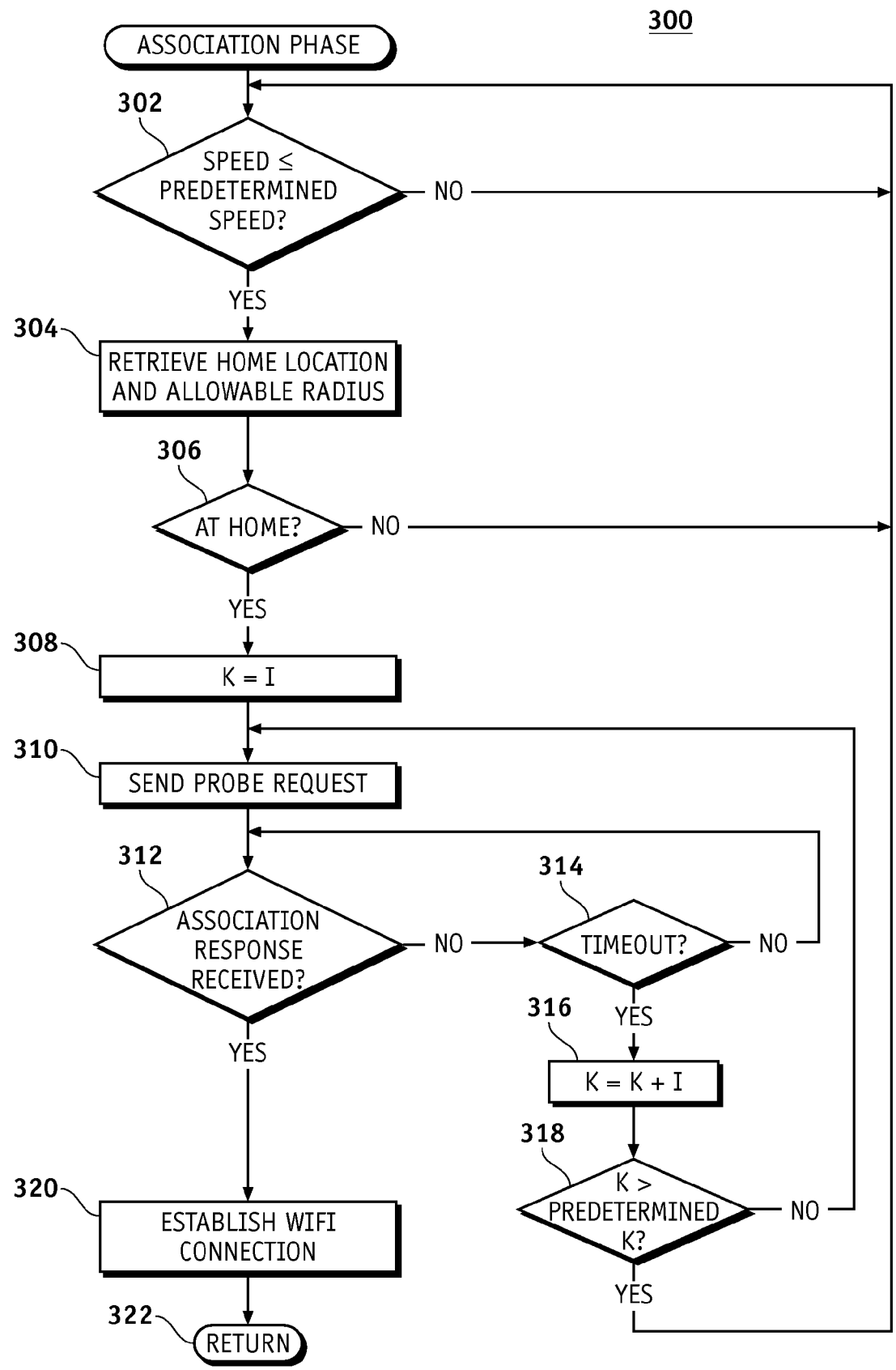
FIG. 3 illustrates a flow chart of an operation of the apparatus of FIG. 2 in accordance with the embodiment of the present invention.

Operation of the controller 208 of the vehicle 106 in accordance with the present embodiment is depicted in a flowchart 300 in FIG. 3. In accordance with this operation, an association phase to initiate communication between the vehicle 106 and the home access point 102, the controller 208 determines from the speed signal 215 whether a speed of the vehicle has fallen below a predetermined speed 302. When the speed is less than the predetermined speed 302, the controller 208 retrieves 304 home location information and an allowable distance (e.g., radius) from the nonvolatile memory 212.

The controller 208 then compares GPS information from the GPS receiver 218 indicating a present location to the predetermined home location information and the allowable radius to determine whether the location of the vehicle 106 is "at home" 306, i.e., less than the allowable radius from the predetermined home location.

When the controller 208 determines that the vehicle 06 is "at home", the controller 208 begins an initiation of an association phase between the vehicle 106 and the home access point 102 in compliance with wireless local area network standard IEEE 802.11. Initially an attempt counter K is set equal to one 308. The attempt counter K tracks the number of unsuccessful attempts to establish the wireless local area connection between the vehicle 106 and the home access point 102. The controller 208 then provides information to the transceiver circuitry 210 for transmitting a probe request 310 to the home access point 102. As described above, a probe request includes sensitive, private information unique to the vehicle 106 and decision steps 302 and 306 advantageously prevent transmission of this private information unless the controller 208 has determined that the vehicle 106 is slowing or stopped 302 near the home access point 306.

After the probe request is sent 310, the controller 208 monitors the information received by the receiver circuitry 206 to determine if an association response has been received 312 from the home access point 102. If no association response from the home access point 102 has been received 312 by the controller 208 within a predetermined timeout period 314, the attempt counter K is incremented by one 316 and checked to determine whether the controller 208 has exceeded the maximum number of unsuccessful attempts 318.

If the maximum number of unsuccessful attempts at establishing an association phase has not been exceeded 318, processing returns to send another probe request 310. When the maximum number of unsuccessful attempts to establish an association phase has been exceeded 318, processing returns to another speed determination 302 and location determination 306 for a subsequent automatic association phase initiation. A message may also be sent to the user advising that communication was not established between the controller 208 and the home access point 102. In this manner, the user is advised that the initiation of communication has been unsuccessful so that the user may attempt to manually establish the connection either from the vehicle 106 or the home access point 102 if desired.

When the controller 208 determines that an association response has been received 312 form the home access point 102 within the predetermined timeout period 314, the controller 208 proceeds to establish a local area wireless communication link 320, such as a WiFi communication link, with the home access point 320 and processing by the controller 208 returns 322 control to the flexible computing platform 214 for communicating with and transferring information with the home access point 102.

While the flowchart 300 is described as an operation of the communication controller 208, the operation could alternatively be handled by the flexible computing platform 214, wherein the flexible computing platform 214 handles the functions of the controller 208, receiving signals from GPS receiver 218 and the memory 212.

Figure 4:
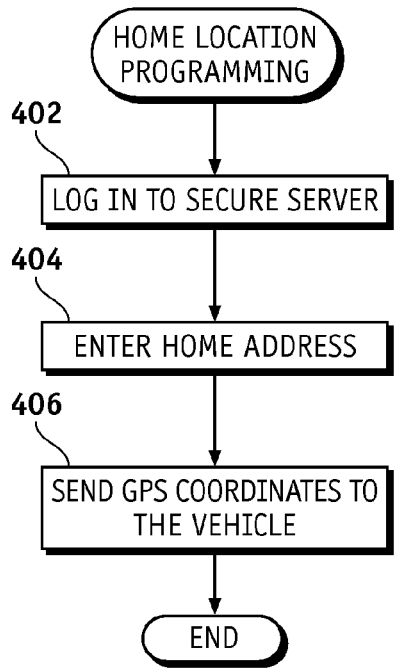
FIG. 4 illustrates a flow chart of a first home location programming operation of the system of FIG. 1 in accordance with the embodiment of the present invention.

Referring next to FIG. 4, a flowchart 400 depicts a first home location programming operation. In accordance with this first home location programming operation, the computer at the home access point 102 is utilized to remotely program the home location into the memory 212 of the vehicle 106.

Initially, a user accesses a secure server by logging in 402 to the secure server from the computer at the home access point 102 via an internet connection. After logging in 402 to the secure server, the user enters 404 his home address. Alternatively, the address could be loaded from a database, particularly where the address being loaded is a home address of an OnStar® customer or is dealer or commercial address. The secure server translates the home address into GPS coordinates corresponding to the home location and asks the user whether he/she wants to send the GPS coordinates to the vehicle for utilization as the home location. In response to the user requesting 406 that the GPS coordinates corresponding to the home location be sent to the vehicle 106, the secure server sends the GPS coordinates to the vehicle 106 by, for example, a wide area communication link such as OnStar®. Alternatively, the GPS coordinates could be provided to the computer at the home access point 102 and either downloaded to a portable storage device such as a universal serial bus (USB) drive for physical transfer to the vehicle 106 or forwarding to the vehicle 106 via a specially setup local area communication link such as a WiFi Protected Setup (WPS). When the vehicle 106 receives the GPS coordinates, the controller 208 stores the information in the memory 212 as the predetermined home location.

Figure 5:
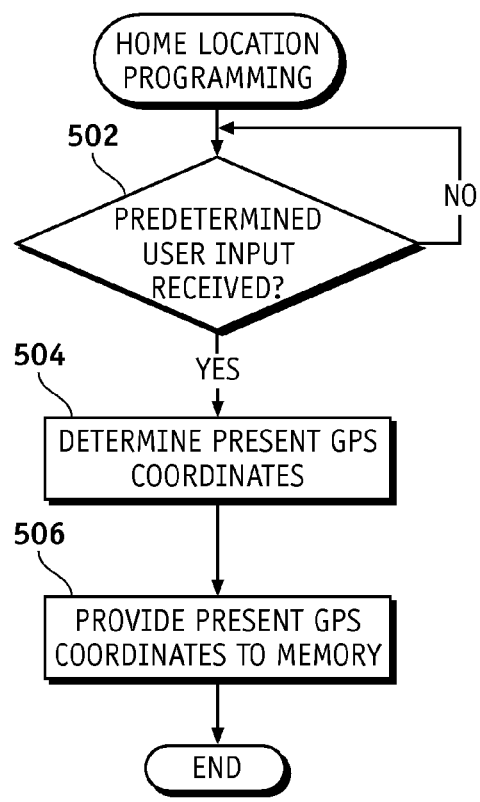
FIG. 5 illustrates a flow chart of a second home location programming operation of the system of FIG. 1 in accordance with the embodiment of the present invention.

Referring to FIG. 5, a flowchart 500 depicts a second home location programming operation. In accordance with this second home location programming operation, the navigation device 220 is utilized to program the home location into the memory 212.

Initially, processing awaits reception of a predetermined user input 502. The predetermined user input 502 could consist of a predetermined keypress of one of the buttons of user input device 228 of the navigation device 220 (e.g., pressing and holding a particular button) or a predetermined keypress of a button of the user interface 216. Alternatively, a predetermined message could be sent from the computer at the home access point 102 via a local area communication link.

Once the predetermined user input is received 502, a present location is determined 504 by the controller 208 in response to GPS coordinates received from the GPS receiver 218. The present GPS coordinates are provided 506 to the memory 212 for storage therein as the predetermined location.

Alternatively, if a predetermined location is stored in the memory 212, additional utilization of this second location programming operation 500 could average the multiple GPS coordinates received and store the average GPS coordinates as the predetermined location.

Thus it can be seen that a method and a vehicle have been provided for initiating RF communication between a vehicle and a home access point which preserves the privacy of both the home access point and the vehicle. While enabling secure communication between the home access point and the vehicle's flexible computing platform 214, the present embodiment protects the privacy of the vehicle while permitting secure communication.

While at least one exemplary embodiment has been presented in the foregoing detailed description, it should be appreciated that a vast number of variations exist. For example, while methods for generating the predetermined location have been discussed in regards to FIGS. 4 and 5, multiple non-custom locations could be pre-populated in the memory 212 at manufacture and one or more could be selected as the predetermined location by the user. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method for initiation of a short range radio frequency (RF) connection between a vehicle and an access point, the method comprising the steps of:
   detecting the speed of the vehicle;
   determining whether the speed of the vehicle is less than a predetermined speed; and
   transmitting a probe request from the vehicle to initiate the short range RF connection in response to a location and a speed of the vehicle, the step of transmitting the probe request comprising the steps of:
      beginning transmission of the probe request including the vehicle specific information in response to the location of the vehicle and a speed of the vehicle when the speed of the vehicle is less than the predetermined speed;
      transmitting the probe request including vehicle specific information until reception of a probe response from the access point; and
      ceasing transmission of the probe request including the vehicle specific information in response to reception of the probe response from the access point.

2. The method in accordance with claim 1 further comprising the steps of:
   detecting the location of the vehicle if the speed of the vehicle is less than a predetermined speed; and determining whether the location of the vehicle is less than a predetermined distance from a predetermined location, wherein the step of transmitting the probe request comprises the steps of:

begin transmitting the probe request including the vehicle specific information when the location of the vehicle is less than the predetermined radius from the predetermined location; and cease transmitting the probe request including the vehicle specific information in response to reception of the probe response from the access point.

3. The method in accordance with claim 1 further comprising the steps of:

detecting the location of the vehicle if the speed of the vehicle is less than the predetermined speed; and determining whether the location of the vehicle is less than a predetermined distance from a predetermined location, wherein the step of beginning to transmit the probe request comprises the step of beginning to transmit the probe request including the vehicle specific information when the speed of the vehicle is less than the predetermined speed and the location of the vehicle is less than the predetermined distance from the predetermined location.

4. The method in accordance with claim 3 further comprising the steps of:

receiving Global Positioning System (GPS) coordinates corresponding to the location of the access point; and storing the GPS coordinates as the predetermined location.

5. The method in accordance with claim 3 further comprising the steps of:

receiving a predetermined location-defining user input;

determining present Global Positioning System (GPS) coordinates in response to receiving the predetermined location-defining user input; and storing the present GPS coordinates as the predetermined location.

6. A vehicle comprising:

transceiver circuitry comprising receiver circuitry and transmitter circuitry;

a Global Positioning System (GPS) receiver for receiving GPS coordinates;

a speed determining device for generating a speed signal corresponding to a speed of the vehicle; and a controller coupled to the GPS receiver for determining a location of the vehicle in response to the GPS coordinates, coupled to the speed determining device for receiving the speed signal, and coupled to the transmitter circuitry for providing a probe request thereto for transmission therefrom in order to initiate a short range radio frequency (RF) connection in response to the location of the vehicle and the speed of the vehicle, wherein the controller determines the speed of the vehicle in response to the speed signal and provides the probe request to the transmitter circuitry for transmission therefrom in order to initiate the short range RF connection in response to the speed of the vehicle being less than a predetermined speed, and wherein the controller provides the probe request including a vehicle service set identifier (SSID) to the transmitter circuitry until detection of a probe response from an access point.

7. The vehicle in accordance with claim 6 wherein the controller determines whether the location of the vehicle is less than a predetermined distance from a predetermined location if the speed of the vehicle is less than a predetermined speed, the controller providing the probe request to the transmitter circuitry for transmission therefrom in order to initiate the short range RF connection when the location of the vehicle is less than the predetermined distance from the predetermined location.

8. The vehicle in accordance with claim 7 further comprising a storage device for non-volatilely storing information therein, wherein the controller receives Global Positioning System (GPS) coordinates corresponding to the location of the access point from the receiver circuitry and is coupled to the storage device for storing the GPS coordinates therein, the controller thereafter retrieving the GPS coordinates as the predetermined location.

9. The vehicle in accordance with claim 7 further comprising:

a storage device for non-volatilely storing information therein; and a user input device for receiving user inputs and generating input signals in response thereto, the user input device receiving a predetermined location-defining user input and generating a predetermined location-defining input signal in response thereto, wherein the controller is coupled to the user input device and the GPS receiver for determining present GPS coordinates in response to receiving the predetermined location-defining input signal, the controller coupled to the storage device for storing the present GPS coordinates as location information therein and thereafter retrieving the location information as the predetermined location.

10. The vehicle in accordance with claim 6 wherein the controller provides the probe request to the transmitter circuitry for transmission therefrom in order to initiate the short range RF connection in response to the location of the vehicle and the speed signal, the controller ceasing to provide the probe request to the transmitter circuitry in response to reception of the probe response from the receiver circuitry.

11. The vehicle in accordance with claim 10 wherein the speed determining device is a speedometer.

* * * * *